US012339362B2

(12) United States Patent
Slobodyanyuk et al.

(10) Patent No.: US 12,339,362 B2
(45) Date of Patent: Jun. 24, 2025

(54) OCCUPANCY CLUSTERING ACCORDING TO RADAR DATA

(71) Applicant: QUALCOMM Incorporated, San Diego, CA (US)

(72) Inventors: Volodimir Slobodyanyuk, San Diego, CA (US); Avdhut Joshi, Carlsbad, CA (US); Sundar Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1039 days.

(21) Appl. No.: 17/220,394

(22) Filed: Apr. 1, 2021

(65) Prior Publication Data
US 2022/0317302 A1 Oct. 6, 2022

(51) Int. Cl.
*G01S 17/89* (2020.01)
*G01S 17/931* (2020.01)
*G05D 1/00* (2006.01)

(52) U.S. Cl.
CPC ............ *G01S 17/89* (2013.01); *G01S 17/931* (2020.01); *G05D 1/0242* (2013.01); *G05D 1/0268* (2013.01)

(58) Field of Classification Search
None
See application file for complete search history.

(56) References Cited

U.S. PATENT DOCUMENTS

| 2016/0033276 A1* | 2/2016 | Bageshwar | G01S 13/867 |
| | | | 702/150 |
| 2018/0203124 A1 | 7/2018 | Izzat et al. | |
| 2021/0020045 A1 | 1/2021 | Huang et al. | |
| 2021/0116568 A1* | 4/2021 | Kanza | G06F 18/23211 |

FOREIGN PATENT DOCUMENTS

EP 3040909 A1 7/2016

OTHER PUBLICATIONS

Dominguez R., et al., "LIDAR based Perception solution for Autonomous Vehicles", 2011 11th International Conference on Intelligent Systems Design and Applications (ISDA), IEEE, Nov. 22, 2011 (Nov. 22, 2011), pp. 790-795, XP032086152, DOI: 10.1109/ISDA.2011.6121753, ISBN: 978-1-4577-1676-8, the whole document.
International Search Report and Written Opinion—PCT/US2022/070438—ISA/EPO—May 25, 2022.
Rubio D.O., et al., "Connected Components for a Fast and Robust 2D Lidar Data Segmentation", 2013 7th Asia Modelling Symposium, Jul. 1, 2013 (Jul. 1, 2013), pp. 160-165, XP055749500, DOI: 10.1109/AMS.2013.31, the whole document.

\* cited by examiner

*Primary Examiner* — Hovhannes Baghdasaryan
(74) *Attorney, Agent, or Firm* — QUALCOMM Incorporated

(57) ABSTRACT

In some aspects, a device may receive, from a radar scanner or a LIDAR scanner of a vehicle, point data that identifies a first point and a second point. The device may receive grid information that identifies cells of a grid that is associated with mapping a physical environment of the vehicle. The device may designate, based on determining that a distance between the first point and the second point satisfies a distance threshold, a subset of the cells as an occupied cluster that is associated with the first point and the second point. The device may perform an action associated with the vehicle based on location information associated with the occupied cluster. Numerous other aspects are described.

30 Claims, 5 Drawing Sheets

OCCUPANCY CLUSTERING ACCORDING TO RADAR DATA

FIELD OF THE DISCLOSURE

Aspects of the present disclosure generally relate to occupancy clustering and, for example, to occupancy clustering according to radar data.

BACKGROUND

Occupancy grid mapping may be used in road scene understanding for autonomous driving. Occupancy grid mapping may encapsulate information of the drivable area and road obstacles of an environment being traveled by an autonomous vehicle.

SUMMARY

In some aspects, a method comprises receiving, by a device and from a radar scanner or a LIDAR scanner of a vehicle, point data that identifies a first point and a second point; receiving, by the device, grid information that identifies cells of a grid that is associated with mapping a physical environment of the vehicle; designating, by the device and based on determining that a distance between the first point and the second point satisfies a distance threshold, a subset of the cells as an occupied cluster that is associated with the first point and the second point; and performing, by the device, an action associated with the vehicle based on location information associated with the occupied cluster.

In some aspects, a device includes one or more memories; and one or more processors, coupled to the one or more memories, configured to receive, from a radar scanner or a LIDAR scanner of a vehicle, point data that identifies a first point and a second point; receive grid information that identifies cells of a grid that is associated with mapping a physical environment of the vehicle; designate, based on determining that a distance between the first point and the second point satisfies a distance threshold, a subset of the cells as an occupied cluster that is associated with the first point and the second point; and perform an action associated with the vehicle based on location information associated with the occupied cluster.

In some aspects, a non-transitory computer-readable medium storing a set of instructions includes one or more instructions that, when executed by one or more processors of a device, cause the device to receive, from a radar scanner or a LIDAR scanner of a vehicle, point data that identifies a first point and a second point; receive grid information that identifies cells of a grid that is associated with mapping a physical environment of the vehicle; designate, based on determining that a distance between the first point and the second point satisfies a distance threshold, a subset of the cells as an occupied cluster that is associated with the first point and the second point; and perform an action associated with the vehicle based on location information associated with the occupied cluster.

In some aspects, an apparatus includes means for receiving, from a radar scanner or a LIDAR scanner of a vehicle, point data that identifies a first point and a second point; means for receiving grid information that identifies cells of a grid that is associated with mapping a physical environment of the vehicle; means for designating, based on determining that a distance between the first point and the second point satisfies a distance threshold, a subset of the cells as an occupied cluster that is associated with the first point and the second point; and means for performing an action associated with the vehicle based on location information associated with the occupied cluster.

Aspects generally include a method, apparatus, system, computer program product, non-transitory computer-readable medium, user device, user equipment, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
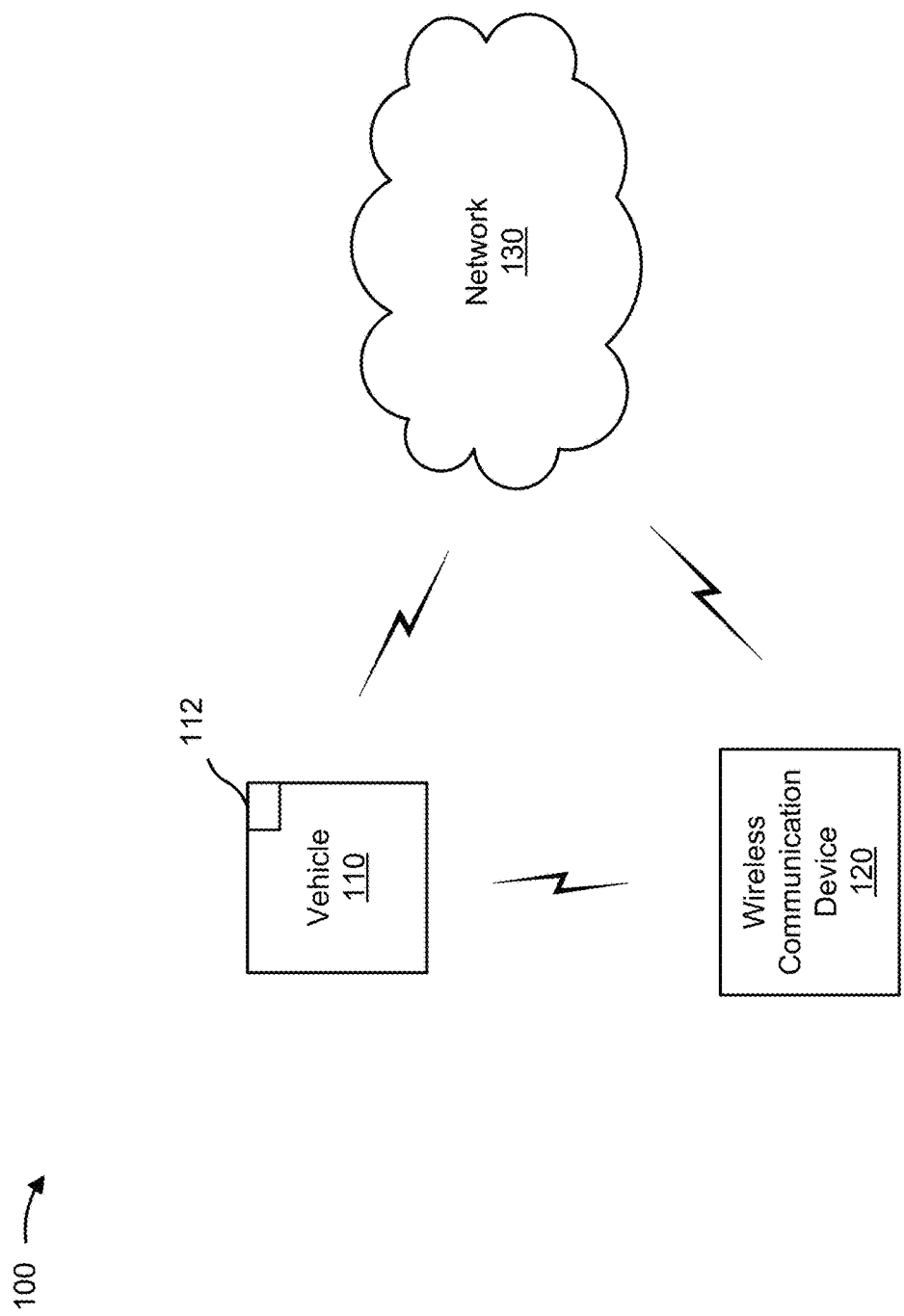
FIG. 1 is a diagram illustrating an example environment in which occupancy clustering described herein may be implemented, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

An autonomous driving system of a vehicle may be configured to identify, in real-time, the occupancy status of the environment surrounding the vehicle and to determine a drivable space that the vehicle is able to occupy based on the occupancy status of the environment. To perform occupancy and free space detection when using a sensor configured to obtain point data of an object (e.g., a radar sensor, a LIDAR sensor, and/or the like), an autonomous driving system of a vehicle may subdivide an area of interest (e.g., an area surrounding the vehicle) into a number of uniformly spaced square grids. Based on the radar returns, the occupancy status of each grid is determined. The autonomous driving system may aggregate the occupied grids (e.g., grids associated with a probability of being occupied that satisfies a threshold probability) into clusters. The autonomous driving system may discard a cluster when the size of the cluster (e.g., a quantity of connected grids associated with the cluster) is below a cluster threshold (e.g., below a threshold quantity of connected grids).

In some cases, an autonomous driving system may change a size of the grid based on a speed of the vehicle, a type of the environment (e.g., rural, urban, and/or the like), a quantity of data points obtained by the sensor, and/or the like. However, changing the size of the grid may result in a change in a quantity of clusters within the grid and/or a shape of the clusters, which may affect the occupancy status determined for an area of the environment.

Some implementations described herein enable an autonomous driving system of a vehicle to perform occupancy clustering according to point data obtained by a radar scanner, a LIDAR scanner, and/or the like. For example, the autonomous driving system may receive, from a radar scanner or a LIDAR scanner of the vehicle, point data that identifies a first point and a second point. The autonomous driving system may receive grid information that identifies cells of a grid that is associated with mapping a physical environment of the vehicle. The autonomous driving system may designate, based on determining that a distance between the first point and the second point satisfies a distance threshold, a subset of cells as an occupied cluster that is associated with the first point and the second point. The autonomous driving system may perform an action associated with the vehicle based on location information associated with the occupied cluster. For example, the autonomous driving system may indicate, via a user interface of the vehicle and based on the location information, a location of the occupied cluster relative to a location of the vehicle and/or may control the vehicle to avoid an area of the physical environment that is indicated in the location information. As a result, the autonomous driving system may achieve a consistent behavior, where a change in the size of the grid results in an incremental change of a cluster's shape and appearance, and preserves the number of clusters. Although aspects of the invention are described in terms of point data obtained by a radar scanner or a LIDAR scanner, the invention may be applied to point data obtained by other types of sensors.

FIG. 1 is a diagram of an example environment 100 in which systems and/or methods described herein may be implemented. As shown in FIG. 1, environment 100 may include a vehicle 110 that includes an electronic control unit (ECU) 112, a wireless communication device 120, and a network 130. Devices of environment 100 may interconnect via wired connections, wireless connections, or a combination of wired and wireless connections.

The vehicle 110 may include any vehicle that is capable of transmitting and/or receiving data associated with occupancy clustering according to radar data, LIDAR data, and/or the like, as described herein. For example, the vehicle 110 may be a consumer vehicle, an industrial vehicle, a commercial vehicle, and/or the like. The vehicle 110 may be capable of traveling and/or providing transportation via public roadways, may be capable of use in operations associated with a worksite (e.g., a construction site), and/or the like. The vehicle 110 may include a sensor system that includes one or more sensors that are used to generate and/or provide vehicle data associated with vehicle 110 and/or a radar scanner and/or a LIDAR scanner that is used to obtain point data used for road scene understanding in autonomous driving.

The vehicle 110 may be controlled by the ECU 112, which may include one or more devices capable of receiving, generating, storing, processing, and/or providing information associated with occupancy clustering according to point data (e.g., data obtained by radar, LIDAR, and/or the like) and/or road scene understanding described herein. For example, the ECU 112 may be associated with an autonomous driving system and/or may include and/or be a component of a communication and/or computing device, such as an onboard computer, a control console, an operator station, or a similar type of device. The ECU 112 may be configured to communicate with an autonomous driving system of the vehicle 110, ECUs of other vehicles, and/or other devices. For example, advances in communication technologies have enabled vehicle-to-everything (V2X) communication, which may include vehicle-to-vehicle (V2V) communication, vehicle-to-pedestrian (V2P) communication, and/or the like. In some aspects, the ECU 112 may receive vehicle data associated with the vehicle 110 (e.g., location information, sensor data, radar data, LIDAR data, and/or the like) and perform occupancy clustering to determine the occupancy status of the environment surrounding the vehicle 110 and to determine a drivable space that the vehicle is able to occupy based on the occupancy status of the environment based on the vehicle data, as described herein.

The wireless communication device 120 includes one or more devices capable of receiving, generating, storing, processing, and/or providing information associated with occupancy clustering according to radar data, as described elsewhere herein. For example, the wireless communication device 120 may include a base station, an access point, and/or the like. Additionally, or alternatively, the wireless communication device 120 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

The network 130 includes one or more wired and/or wireless networks. For example, the network 130 may include a peer-to-peer (P2P) network, a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some aspects, the network 130 may include and/or be a P2P communication link that is directly between one or more of the devices of environment 100.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
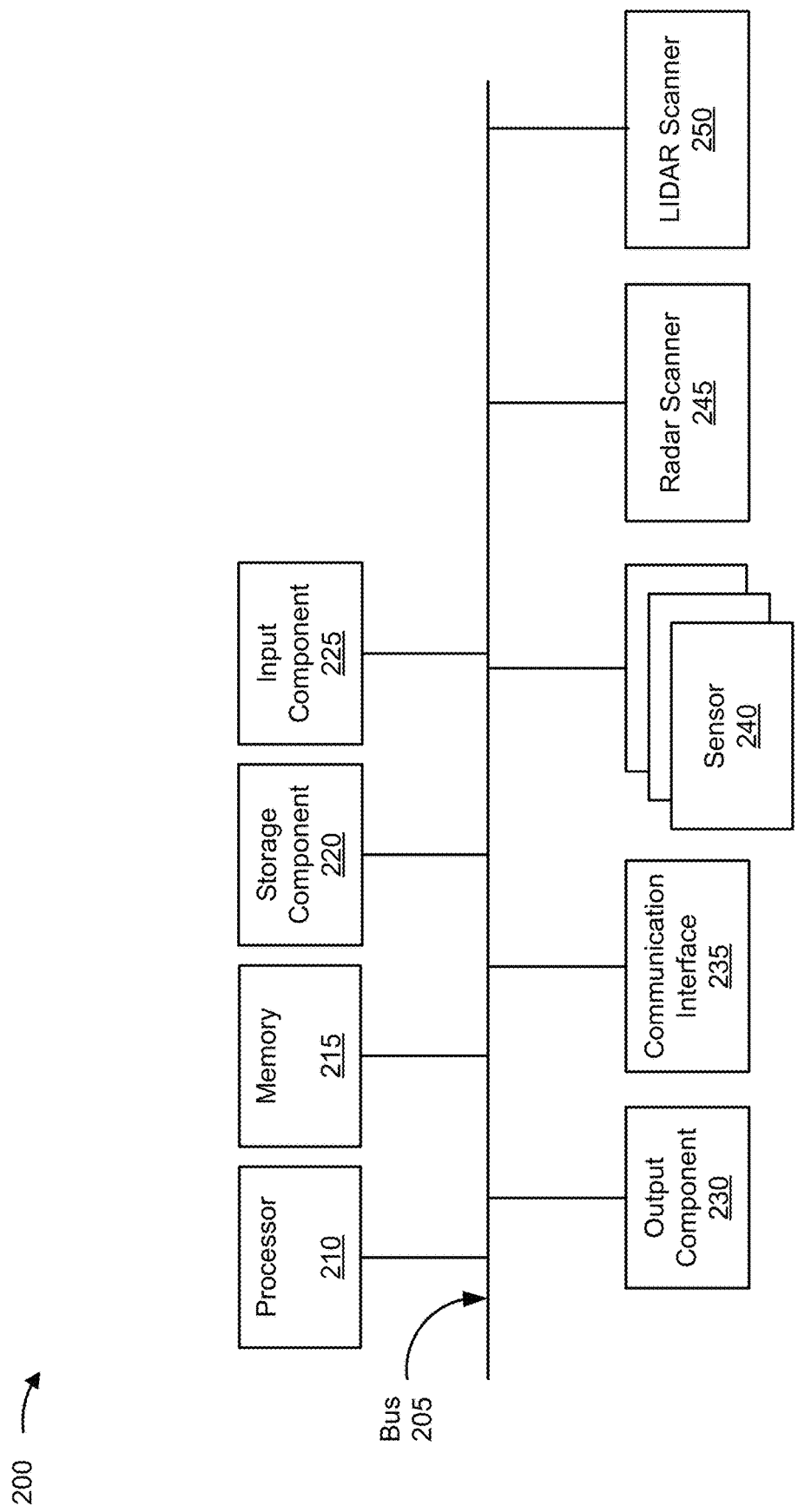
FIG. 2 is a diagram illustrating example components of one or more devices shown in FIG. 1, such as a vehicle and/or a wireless communication device, in accordance with the present disclosure.

FIG. 2 is a diagram illustrating example components of a device 200, in accordance with the present disclosure. Device 200 may correspond to the ECU 112 and/or the wireless communication device 120. In some aspects, ECU 112 and/or the wireless communication device 120 may include one or more devices 200 and/or one or more components of device 200. As shown in FIG. 2, device 200 may include a bus 205, a processor 210, a memory 215, a storage component 220, an input component 225, an output component 230, a communication interface 235, a sensor 240, a radar scanner 245, and/or a LIDAR scanner 250.

Bus 205 includes a component that permits communication among the components of device 200. Processor 210 is implemented in hardware, firmware, or a combination of hardware and software. Processor 210 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 210 includes one or more processors capable of being programmed to perform a function. Memory 215 includes a random access memory (RAM), a read only memory (ROM), and/or another type of dynamic or static storage device (e.g., a flash memory, a magnetic memory, and/or an optical memory) that stores information and/or instructions for use by processor 210.

Storage component 220 stores information and/or software related to the operation and use of device 200. For example, storage component 220 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 225 includes a component that permits device 200 to receive information, such as via user input (e.g., a touch screen display, a keyboard, a keypad, a mouse, a button, a switch, and/or a microphone). Additionally, or alternatively, input component 225 may include a component for determining a position or a location of device 200 (e.g., a global positioning system (GPS) component or a global navigation satellite system (GNSS) component) and/or a sensor for sensing information (e.g., an accelerometer, a gyroscope, an actuator, or another type of position or environment sensor). Output component 230 includes a component that provides output information from device 200 (e.g., a display, a speaker, a haptic feedback component, and/or an audio or visual indicator).

Communication interface 235 includes a transceiver-like component (e.g., a transceiver and/or a separate receiver and transmitter) that enables device 200 to communicate with other devices, such as via a wired connection, a wireless connection, or a combination of wired and wireless connections. Communication interface 235 may permit device 200 to receive information from another device and/or provide information to another device. For example, communication interface 235 may include an Ethernet interface, an optical interface, a coaxial interface, an infrared interface, a radio frequency interface, a universal serial bus (USB) interface, a wireless local area interface (e.g., a Wi-Fi interface), and/or a cellular network interface.

The sensor 240 includes one or more devices capable of sensing characteristics associated with device the 200. The sensor 240 may include one or more integrated circuits (e.g., on a packaged silicon die) and/or one or more passive components of one or more flex circuits to enable communication with one or more components of the device 200.

The sensor 240 may include an optical sensor that has a field of view in which the sensor 240 may determine one or more characteristics of an environment of the device 200. In some aspects, the sensor 240 may include a camera. For example, the sensor 240 may include a low-resolution camera (e.g., a video graphics array (VGA)) that is capable of capturing images that are less than one megapixel, images that are less than 1216×912 pixels, and/or the like. The sensor 240 may be a low-power device (e.g., a device that consumes less than ten milliwatts (mW) of power) that has always-on capability while the device 200 is powered on.

Additionally, or alternatively, the sensor 240 may include magnetometer (e.g., a Hall effect sensor, an anisotropic magneto-resistive (AMR) sensor, a giant magneto-resistive sensor (GMR), and/or the like), a location sensor (e.g., a GPS receiver, a local positioning system (LPS) device (e.g, that uses triangulation, multi-lateration, and/or the like), and/or the like), a gyroscope (e.g., a micro-electro-mechanical systems (MEEMS) gyroscope or a similar type of device), an accelerometer, a speed sensor, a motion sensor, an infrared sensor, a temperature sensor, a pressure sensor, and/or the like.

The radar scanner 245 may include one or more devices that use radio waves to determine the range, angle, and/or velocity of an object based on radar data obtained by the radar scanner 245. The radar scanner 245 may provide the radar data to the ECU 112 to enable the ECU 112 to perform occupancy clustering according to the radar data, as described herein.

The LIDAR scanner 250 may include one or more devices that use light in the form of a pulsed laser to measure distances of objects from the LIDAR scanner based on LIDAR data obtained by the LIDAR scanner 250. The LIDAR scanner 250 may provide the LIDAR data to the ECU 112 to enable the ECU 112 to perform occupancy clustering according to the radar data, as described herein.

Device 200 may perform one or more processes described herein. Device 200 may perform these processes based on processor 210 executing software instructions stored by a non-transitory computer-readable medium, such as memory 215 and/or storage component 220. A computer-readable medium is defined herein as a non-transitory memory device. A memory device includes memory space within a single physical storage device or memory space spread across multiple physical storage devices.

Software instructions may be read into memory 215 and/or storage component 220 from another computer-readable medium or from another device via communication interface 235. When executed, software instructions stored in memory 215 and/or storage component 220 may cause processor 210 to perform one or more processes described herein. Additionally, or alternatively, hardwired circuitry may be used in place of or in combination with software instructions to perform one or more processes described herein. Thus, aspects described herein are not limited to any specific combination of hardware circuitry and software.

In some aspects, device 200 includes means for performing one or more processes described herein and/or means for performing one or more operations of the processes described herein. For example, device 200 may include means for receiving, from a radar scanner or a LIDAR scanner of a vehicle, point data that identifies a first point and a second point; means for receiving grid information that identifies cells of a grid that is associated with mapping a physical environment of the vehicle; means for designating, based on determining that a distance between the first point and the second point satisfies a distance threshold, a subset of the cells as an occupied cluster that is associated with the first point and the second point; and means for performing an action associated with the vehicle based on location information associated with the occupied cluster. In some aspects, such means may include one or more components of device 200 described in connection with FIG. 2, such as bus 205, processor 210, memory 215, storage component 220, input component 225, output component 230, communication interface 235, sensor 240, and/or radar scanner 245.

The number and arrangement of components shown in FIG. 2 are provided as an example. In practice, device 200 may include additional components, fewer components, different components, or differently arranged components than those shown in FIG. 2. Additionally, or alternatively, a set of components (e.g., one or more components) of device 200 may perform one or more functions described as being performed by another set of components of device 200.

Figure 3:
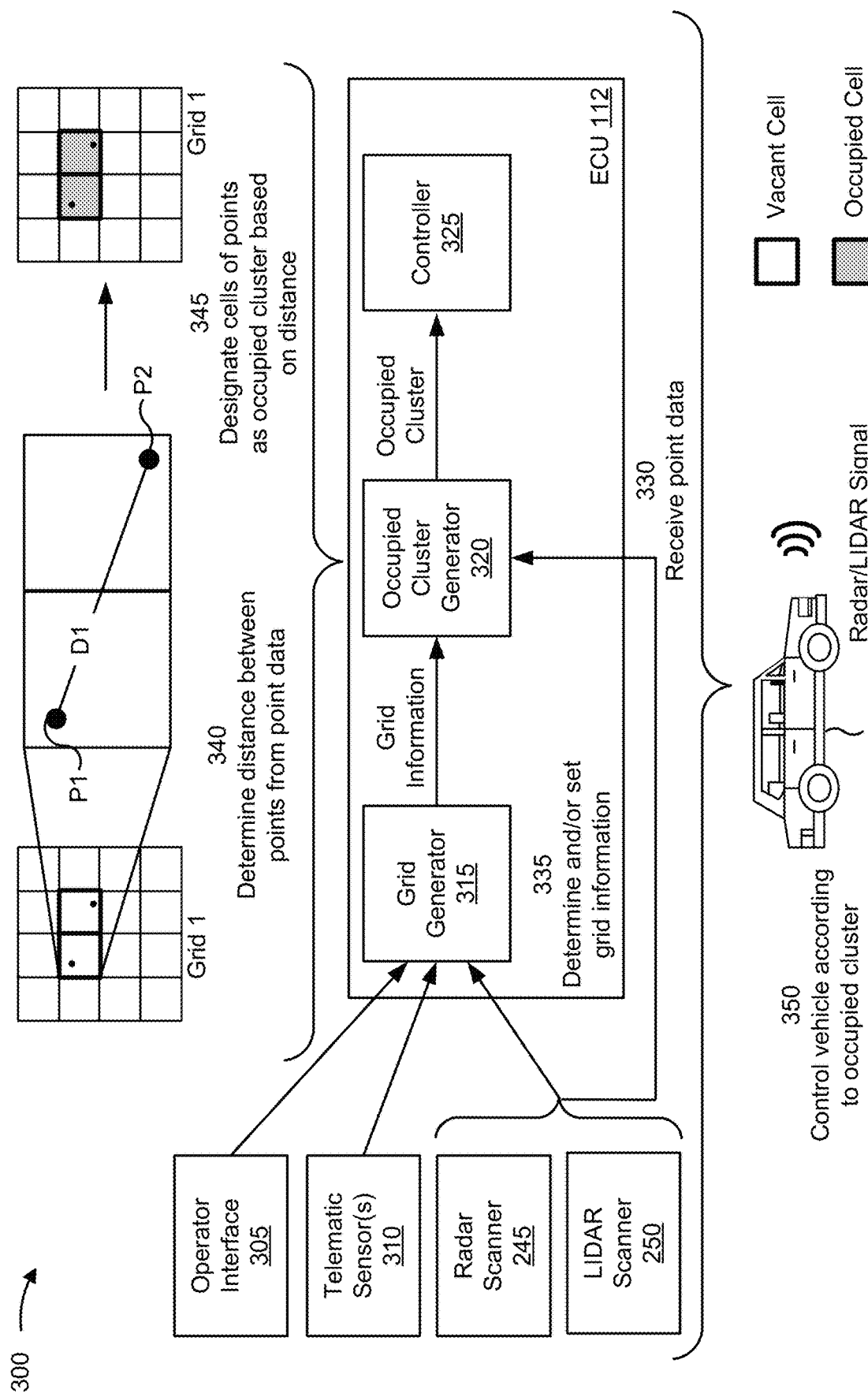
FIGS. 3-4 are diagrams illustrating examples associated with occupancy clustering, in accordance with the present disclosure.

FIG. 3 is a diagram illustrating an example 300 associated with occupancy clustering according to radar data or LIDAR data, in accordance with the present disclosure. As shown in FIG. 3, example 300 includes communication between an operator interface 305, a group of telematic sensors 310 (e.g., a group of sensor devices, such as a gyroscope, an accelerometer, and/or a location device (e.g., a GPS device), among other examples), a radar scanner 245, a LIDAR scanner 250, and an ECU 112 of a vehicle 110. The operator interface 305, the group of telematic sensors 310, the radar scanner 245, the LIDAR scanner 250, and the ECU 112 may communicate via a wired and/or a wireless network.

As shown by reference number 330, the ECU 112 receives point data from the radar scanner 245 and/or the LIDAR scanner 250. The point data may identify a plurality of points corresponding to one or more objects located in a physical environment of the vehicle 110. For example, the radar scanner 245 may send out one or more pulses of electromagnetic waves. The one or more pulses may be reflected by an object in a path of the one or more pulses. The reflection may be received by the radar scanner 245. The radar scanner 245 may determine one or more characteristics (e.g., an amplitude, a frequency, and/or the like) associated with the reflected pulses and may determine point data indicating a location of the object based on the one or more characteristics. The radar scanner 245 may provide the point data to the ECU 112.

Alternatively, and/or additionally, the LIDAR scanner 250 may send out one or more pulses of light. The one or more pulses may be reflected by an object in a path of the one or more pulses. The reflection may be received by the LIDAR scanner 250. The LIDAR scanner 250 may determine one or more characteristics associated with the reflected pulses and may determine point data indicating a location of the object based on the one or more characteristics. The LIDAR scanner 250 may provide the point data to the ECU 112.

As shown by reference number 335, the ECU 112 (e.g., a grid generator component 315, as shown in FIG. 3) determines and/or sets grid information. The ECU 112 may receive grid information that identifies cells of a grid (e.g., Grid 1, as shown in FIG. 3) that is associated with mapping a physical environment of the vehicle 110. The ECU 112 may receive the grid information periodically (e.g., every ten seconds, every minute, and/or the like), based on a change in a size of the cells of the grid, based on a change in coordinates of the cells of the grid, based on transmitting a request, and/or the like.

The grid information may include information identifying cells of a grid that is associated with mapping a physical environment of the vehicle 110 to a coordinate system. The grid may include a plurality of uniformly sized and/or shaped cells. Each cell may represent a corresponding area of the physical environment of the vehicle 110.

In some aspects, an origin of the grid corresponds to a location of the vehicle 110, a location of the radar scanner 245, and/or a location of the LIDAR scanner 250 in the physical environment. For example, the ECU 112 may receive telematics data from one or more telematics sensors 310 associated with the vehicle 110. The telematics data may include information identifying a location of the vehicle 110, a location of the radar scanner 245, and/or a location of the LIDAR scanner 250 at a time associated with the point data. The ECU 112 may generate a grid having an origin corresponding to the location of the vehicle 110, the location of the radar scanner 245, and/or the location of the LIDAR scanner 250.

In some aspects, the grid information includes information identifying a size of the cells of the grid, coordinates of the cells that define the grid, and/or the like. For example, the cells may have a rectangular shape, and the grid information may include information identifying a length of a cell, a width of a cell, an area encompassed by a cell, and/or the like. Alternatively, and/or additionally, the grid information may include information identifying a location of a cell with respect to the origin of the grid.

In some aspects, the ECU 112 determines the size of the cells that define the grid based at least in part on the telematics data. For example, the ECU 112 may determine the size of the cells based on telematics data indicating a speed of the vehicle 110, telematics data indicating a location of the vehicle 110, telematics data indicating a route being traveled by the vehicle 110 (e.g., navigation information obtained by a GPS device).

Alternatively, and/or additionally, the ECU 112 may determine the size of the cells based on user input. For example, a user may input, via the operator interface 305, information indicating a size of the cells and/or information for selecting a grid size (e.g., a type of environment being traveled, such as urban, rural, and/or the like). The ECU 112 may determine the size of the cells based on the input information.

As shown by reference number 340, the ECU 112 (e.g., an occupied cluster generator component 320, as shown in FIG. 3) determines a distance between points from the point data. For example, the ECU 112 may determine a distance D1 between a first point P1 and a second point P2, of the plurality of points identified by the point data. In some aspects, the distance D1 between the first point P1 and the second point P2 is a physical distance that is determined based on a grid location of the first point P1 and a grid location of the second point P2. The point data may include location information identifying a location of the first point P1 and a location of the second point P2 in the physical environment. The ECU 112 may determine a corresponding grid location for the first point P1 and the second point P2 based on the location information.

The ECU 112 may determine a distance D1 between the first point P1 and the second point P2 in the grid based on the grid locations for the first point P1 and the second point P2. The ECU 112 may determine a physical distance between the first point and the second point in the physical environment based on the distance D1 between the first point P1 and the second point P2 in the grid. For example, the ECU 112 may multiple the distance D1 between the first point P1 and the second point P2 by a factor corresponding to a scale of the grid relative to the physical environment.

In some aspects, the distance D1 is a grid distance that is determined based on a quantity of cells along a line between a first cell that includes a grid location of the first point P and a second cell that includes a grid location of the second point P2. For example, the ECU 112 may determine a grid location for the first point P1 and a grid location for the second point P2. The ECU 112 may identify a series of cells intersected by a line connecting the first point P1 and the second point P2 in the grid. The ECU 112 may determine the grid distance based on a quantity of cells included in the series of cells. For example, the ECU 112 may determine the grid distance of 2 based on the line connecting the first point P1 and the second point P2 intersecting the first cell and the second cell.

As shown by reference number 345, the ECU 112 (e.g., the occupied cluster generator 320) designates cells of points as an occupied cluster based on the distance. In some aspects, the ECU 112 designates cells of points as an occupied cluster based at least in part on a distance between the points of the cells satisfying a threshold. In some aspects, the distance threshold is a dynamic threshold that is configured based on one or more variables. For example, the distance threshold may be configured based on a speed of the vehicle 110, a density of points in the point data, a physical characteristic of the vehicle 110 (e.g., a size of the vehicle 110, a weight of the vehicle 110, and/or the like), and/or an operator characteristic of an operator of the vehicle 110 (e.g., preference information associated with the distance threshold and input by an operator of the vehicle 110 via the operator interface 305), among other examples.

In some aspects, the distance is a grid distance that is determined based on a quantity of cells intersected by a line between a first cell that includes a grid location of the first point P1 and a second cell that includes a grid location of the second point P2 and the distance threshold is a quantity threshold (e.g., at least three cells intersected by the line between the first cell and the second cell). The quantity threshold may be configured based on a size of the cells of the grid. As an example, the quantity threshold may be a first quantity of cells based at least in part on the size of the cells being a first size. The quantity threshold may be a second quantity of cells based on at least in part on the size of the cells being a second size. The second size may be larger than the first size. The second quantity of cells may be less than the first quantity of cells based on the second size being larger than the first size.

The ECU 112 may designate a subset of the cells as an occupied cluster that is associated with the first point P1 and the second point P2 based on the distance D1 between the first point P1 and the second point P2 satisfying the distance threshold. In some aspects, as described in greater detail below with respect to FIG. 4, the subset of the cells may include a group of cells intersected by a line connecting the first point P1 and the second point P2 on the grid. For example, the subset of the cells may include a group of cells intersected by a line connecting the first point P1 and the second point P2 on the grid when the distance between the first point and the second point satisfies the distance threshold. The subset of the cells may include a first cell that includes a grid location of the first point, a second cell that includes a grid location of the second point, and a third cell that is located in the grid between the first cell and the second cell (e.g., the third cell is adjacent to both the first cell and the second cell in the grid).

In some aspects, the subset of cells includes a first cell including a grid location of the first point P1 and a second cell including a grid location of the second point P2. For example, as shown in FIG. 3, the subset of cells includes the first cell and the second cell. The subset of cells may include the first cell and the second cell based on the distance D1 between the first point and the second point failing to satisfy the distance threshold and/or based on the first cell being adjacent to the second cell.

As shown by reference number 350, the ECU 112 (e.g., a controller 325, as shown in FIG. 3) controls the vehicle 110 according to the occupied cluster. The ECU 112 may perform an action (e.g., accelerating, decelerating, stopping, changing lanes, and/or the like) associated with controlling the vehicle 112 based on location information associated with the occupied cluster. In some aspects, the location information indicates a grid location associated with one or more of the subset of the cells included in the occupied cluster. The ECU 112 may translate the grid information to an area of the physical environment corresponding to an area of the grid that includes the one or more of the subset of the cells.

In some aspects, the location information indicates an area of the physical environment that is occupied by one or more objects. The area of the physical environment may correspond to an area of the grid that includes the subset of the cells.

In some aspects, performing the action includes the ECU 112 indicating, via a user interface (e.g., the operator interface 305 and/or another user interface) of the vehicle 110 and based at least in part on the location information, a location of the occupied cluster relative to a location of the vehicle 110. For example, the user interface may display a map of the physical environment of the vehicle 110. An origin of the grid may correspond to a current location of the vehicle 110. The ECU 112 may cause information associated with the occupied cluster (e.g., an icon and/or another type of information) to be displayed on the map at a location corresponding to a location of the occupied cluster in the grid in conjunction with information associated with the current location of the vehicle 110.

As indicated above, FIG. 3 is provided as an example. Other examples may differ from what is described with respect to FIG. 3.

Figure 4:
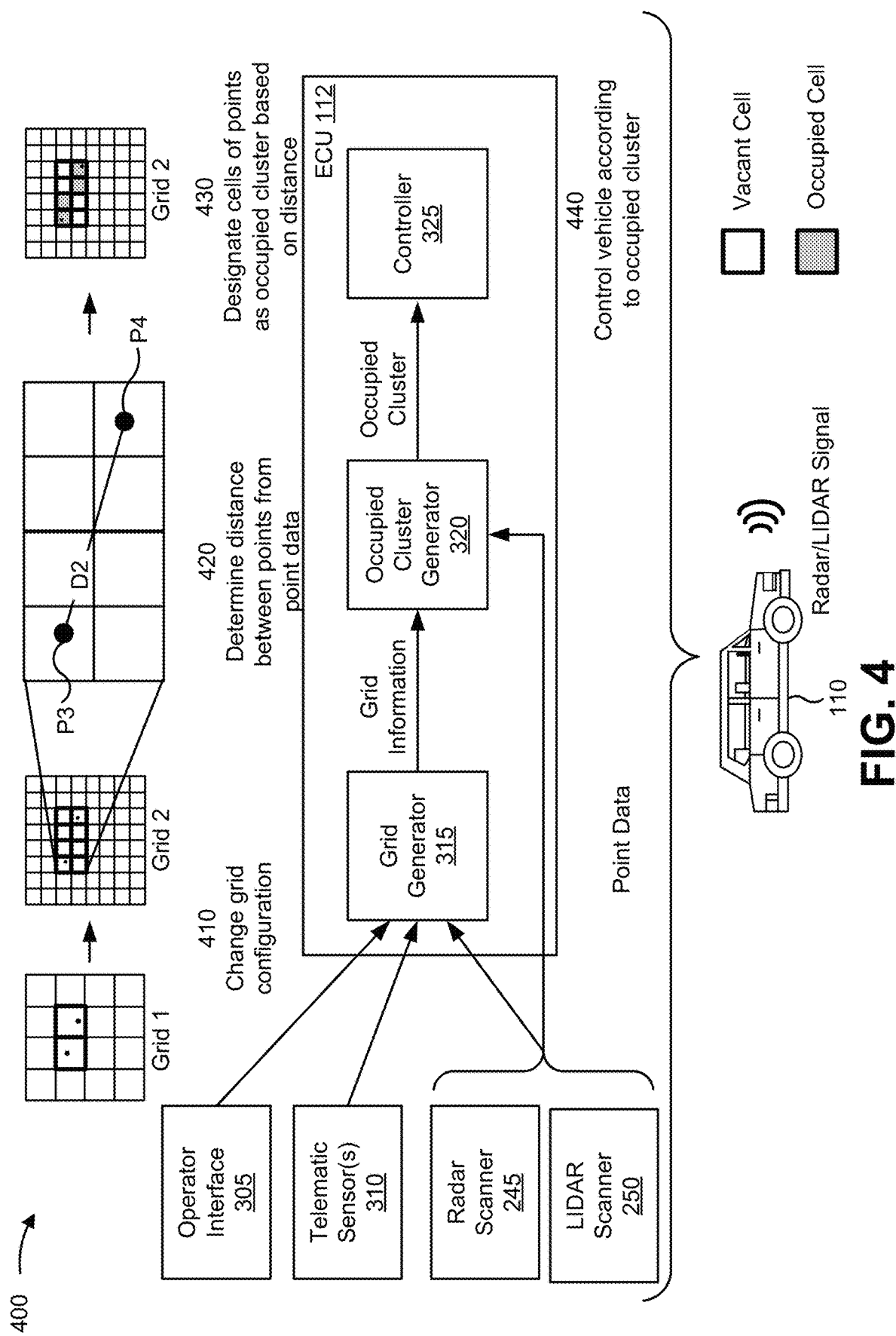

FIG. 4 is a diagram illustrating an example 400 associated with occupancy clustering according to radar data, in accordance with the present disclosure. As shown in FIG. 4, example 400 includes communication between an operator interface 305, a group of telematic sensors 310 (e.g., e.g., a group of sensors 240, such as a gyroscope, an accelerometer, and/or a location device (e.g., a GPS device), among other examples), a radar scanner 245, a LIDAR scanner 250, and an ECU 112 of a vehicle 110. The operator interface 305, the group of telematic sensors 310, the radar scanner 245, the LIDAR scanner 250, and the ECU 112 may communicate via a wired and/or a wireless network.

As shown in FIG. 4, the ECU 112 receives point data from the radar scanner 245 and/or the LIDAR scanner 250. The point data may identify a plurality of points corresponding to one or more objects located in a physical environment of the vehicle 110. For example, the radar scanner 245 may send out one or more pulses of electromagnetic waves. The one or more pulses may be reflected by an object in a path of the one or more pulses. The reflection may be received by the radar scanner 245. The radar scanner 245 may determine one or more characteristics (e.g., an amplitude, a frequency, and/or the like) associated with the reflected pulses and may determine point data indicating a location of the object based on the one or more characteristics. The radar scanner 245 may provide the point data to the ECU 112.

Alternatively, and/or additionally, the LIDAR scanner 250 may send out one or more pulses of light. The one or more pulses may be reflected by an object in a path of the one or more pulses. The reflection may be received by the LIDAR scanner 250. The LIDAR scanner 250 may determine one or more characteristics associated with the reflected pulses and may determine point data indicating a location of the object based on the one or more characteristics. The LIDAR scanner 250 may provide the point data to the ECU 112.

As shown by reference number 410, the ECU 112 changes a grid configuration. The ECU 112 may change a grid configuration of a grid representing a physical environment of the vehicle 110 based on a change in a speed of the vehicle 110, a change in a type of environment (e.g., rural, urban, and/or the like) traveled by the vehicle 110, based on information input by an operator of the vehicle 110 (e.g., via the operator interface 305), and/or the like. The ECU 112 may change the grid configuration based on changing a size of the cells in the grid, an origin of the grid, a quantity of cells included in the grid, and/or the like. As shown in FIG. 4, the ECU 112 decreases a size of the cells in the grid 1 and generates a new grid (e.g., grid 2, as shown in FIG. 4) based at least in part on decreasing the size of the cells in the grid 1.

The ECU 112 may determine new grid information based at least in part on changing the grid configuration. The new grid information may identify cells of a grid that is associated with mapping a physical environment of the vehicle 110. In some aspects, the ECU 112 determines the new grid information in a manner similar to that described above with respect to FIG. 3.

As shown by reference number 420, the ECU 112 determines a distance between points from the point data. In some aspects, the ECU 112 determines the distance D2 between a third point P3 and a fourth point P4 identified in the point data in a manner similar to that described above with respect to FIG. 3. In some aspects, the third point P3 and the fourth point P4 in grid 2 correspond to the first point P1 and the second P2, respectively, in grid 1, described above with respect to FIG. 3.

As shown by reference number 430, the ECU 112 designates cells of points as an occupied cluster based on the distance. In some aspects, the ECU 112 designates cells of points as an occupied cluster based on the distance in a manner similar to that described above with respect to FIG. 3.

In some aspects, the ECU 112 designates a subset of the cells as an occupied cluster that is associated with the third point P3 and the fourth point P4 based on the distance D2 between the third point P3 and the fourth point P4 satisfying the distance threshold. In some aspects, the subset of the cells may include a group of cells intersected by a line connecting the third point P3 and the fourth point P4 on the grid. For example, as shown in FIG. 4, the ECU 112 may determine that the grid distance D2 (e.g., a quantity of cells intersected by a line connecting the third point P3 and the fourth point P4) between the third point P3 and the fourth point P4 (e.g., a quantity of 4 cells, as shown in FIG. 4) satisfies the distance threshold (e.g., a quantity of 3 cells intersected by the line connecting the third point P3 and the fourth point P4).

The ECU 112 may determine that the subset of the cells includes a group of cells intersected by the line connecting the third point P3 and the fourth point P4 on the grid based on the grid distance D2 between the third point P3 and the fourth point P4 satisfying the distance threshold. As shown, the subset of the cells includes a first cell that includes a grid location of the third point P3, a second cell that includes a grid location of the fourth point P4, a third cell that is located adjacent to the first cell, and a fourth cell that is located adjacent to the second cell.

As shown by reference number 440, the ECU 112 controls the vehicle 110 according to the occupied cluster. In some aspects, the ECU 112 controls the vehicle 110 according to the occupied cluster in a manner similar to that described above with respect to FIG. 3.

As indicated above, FIG. 4 is provided as an example. Other examples may differ from what is described with respect to FIG. 4.

Figure 5:
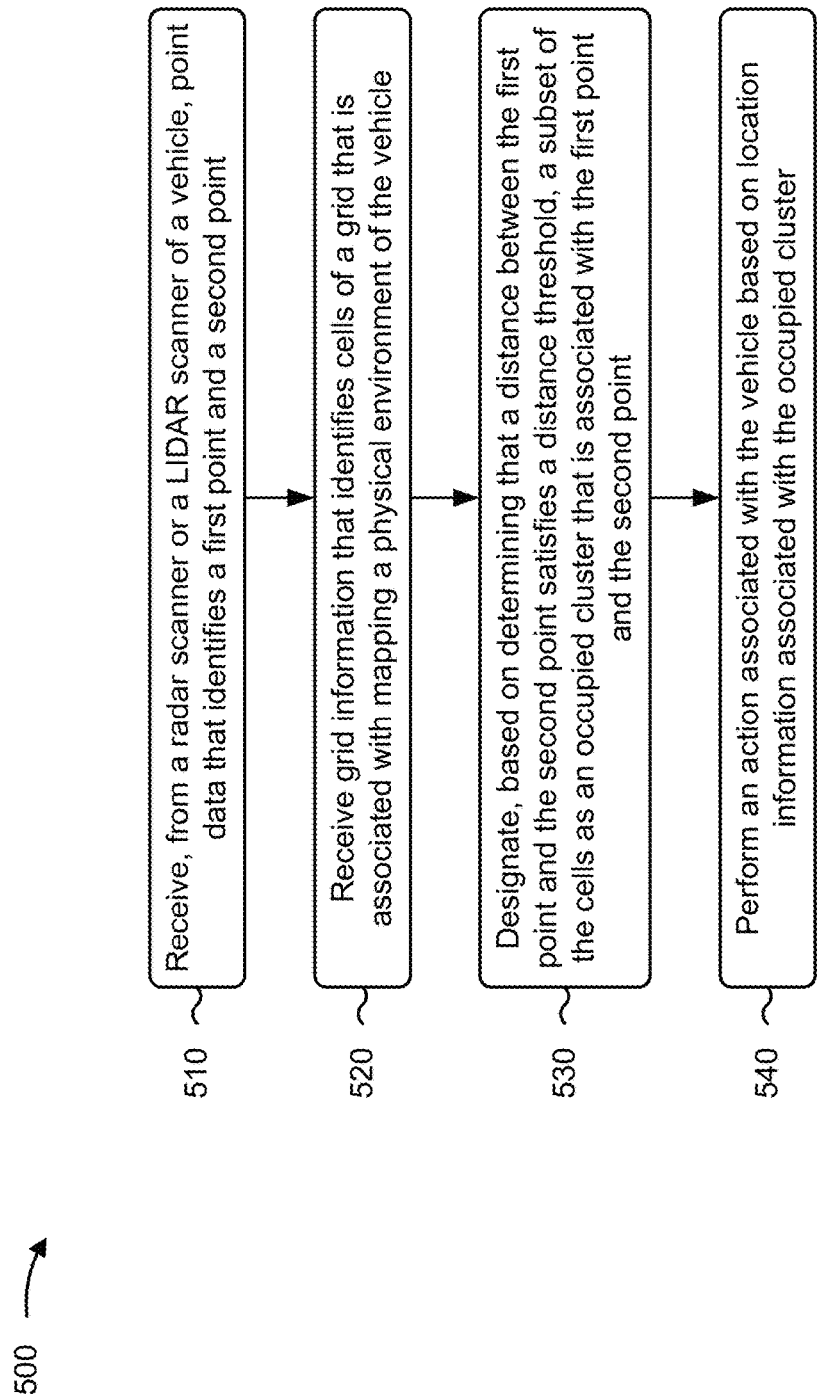
FIG. 5 is a flowchart of example processes associated with occupancy clustering, in accordance with the present disclosure.

FIG. 5 is a flowchart of an example process 500 associated with occupancy clustering according to radar data. In some implementations, one or more process blocks of FIG. 5 may be performed by a device (e.g., the ECU 112). In some implementations, one or more process blocks of FIG. 5 may be performed by another device or a group of devices separate from or including the device, such as a vehicle (e.g., the vehicle 110) and/or a wireless communication device (e.g., the wireless communication device 120). Additionally, or alternatively, one or more process blocks of FIG. 5 may be performed by one or more components of device 200, such as the processor 210, the memory 215, the storage component 220, the input component 225, the output component 230, the communication interface 235, the sensor 240, the radar scanner 245, and/or the LIDAR scanner 250.

As shown in FIG. 5, process 500 may include receiving, from a radar scanner or a LIDAR scanner of a vehicle, point data that identifies a first point and a second point (block 510). For example, the device may receive, from a radar scanner or a LIDAR scanner of a vehicle, point data that identifies a first point and a second point, as described above.

As further shown in FIG. 5, process 500 may include receiving grid information that identifies cells of a grid that is associated with mapping a physical environment of the vehicle (block 520). For example, the device may receive grid information that identifies cells of a grid that is associated with mapping a physical environment of the vehicle, as described above.

As further shown in FIG. 5, process 500 may include designating, based on determining that a distance between the first point and the second point satisfies a distance threshold, a subset of the cells as an occupied cluster that is associated with the first point and the second point (block 530). For example, the device may designate, based on determining that a distance between the first point and the second point satisfies a distance threshold, a subset of the cells as an occupied cluster that is associated with the first point and the second point, as described above.

As further shown in FIG. 5, process 500 may include performing an action associated with the vehicle based on location information associated with the occupied cluster (block 540). For example, the device may perform an action associated with the vehicle based on location information associated with the occupied cluster, as described above.

Process 500 may include additional implementations, such as any single implementation or any combination of implementations described below and/or in connection with one or more other processes described elsewhere herein.

In a first implementation, the grid information identifies at least one of a size of the cells, or coordinates of the cells that define the grid.

In a second implementation, alone or in combination with the first implementation, the grid information is received based at least in part on a change in a size of the cells of the grid, or a change in coordinates of the cells of the grid.

In a third implementation, alone or in combination with the first and second implementations, the distance threshold is a dynamic threshold that is configured based at least in part on at least one of a speed of the vehicle, a density of points in the point data, a physical characteristic of the vehicle, or an operator characteristic of an operator of the vehicle.

In a fourth implementation, alone or in combination with the first through third implementations, the subset of the cells are in line with a first grid location of the first point and a second grid location of the second point.

In a fifth implementation, alone or in combination with the first through fourth implementations, the subset of the cells includes at least one of a first cell that includes a first grid location of the first point, a second cell that includes a second grid location of the second point, or a third cell that is located within the grid between the first point and the second point.

In a sixth implementation, alone or in combination with the first through fifth implementations, the distance is a physical distance that is determined based on a first grid location of the first point and a second grid location of the second point.

In a seventh implementation, alone or in combination with the first through sixth implementations, the distance is a grid distance that is determined based on a quantity of cells along a line between a first cell that includes the first point and a second cell that includes the second point, and wherein the distance threshold comprises a quantity threshold that is based on a size of the cells of the grid.

In an eighth implementation, alone or in combination with the first through seventh implementations, the location information indicates an area of the physical environment that is occupied by one or more objects, wherein the area of the physical environment corresponds to an area of the grid that includes the subset of the cells.

In a ninth implementation, alone or in combination with the first through eighth implementations, the location information indicates a grid location associated with one or more of the subset of the cells.

In a tenth implementation, alone or in combination with the first through ninth implementations, performing the action comprises indicating, via a user interface of the vehicle and based on the location information, a location of the occupied cluster relative to a location of the vehicle.

In an eleventh implementation, alone or in combination with the first through tenth implementations, performing the action comprises controlling the vehicle to avoid an area of the physical environment that is indicated in the location information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The following provides an overview of some Aspects of the present disclosure:

Aspect 1: A method comprising: receiving, by a device and from a radar scanner or a LIDAR scanner of a vehicle, point data that identifies a first point and a second point; receiving, by the device, grid information that identifies cells of a grid that is associated with mapping a physical environment of the vehicle; designating, by the device and based on determining that a distance between the first point and the second point satisfies a distance threshold, a subset of the cells as an occupied cluster that is associated with the first point and the second point; and performing, by the device, an action associated with the vehicle based on location information associated with the occupied cluster.

Aspect 2: The method of Aspect 1, wherein the grid information identifies at least one of: a size of the cells, or coordinates of the cells that define the grid.

Aspect 3: The method of any of Aspects 1 and 2, wherein the grid information is received based at least in part on: a change in a size of the cells of the grid, or a change in coordinates of the cells of the grid.

Aspect 4: The method of any of Aspects 1 through 3, wherein the distance threshold is a dynamic threshold that is configured based at least in part on at least one of: a speed of the vehicle, a density of points in the point data, a physical characteristic of the vehicle, or an operator characteristic of an operator of the vehicle.

Aspect 5: The method of any of Aspects 1 through 4, wherein the subset of the cells are in line with a first grid location of the first point and a second grid location of the second point.

Aspect 6: The method of any of Aspects 1 through 5, wherein the subset of the cells includes at least one of: a first cell that includes a first grid location of the first point, a second cell that includes a second grid location of the second point, or a third cell that is located within the grid between the first point and the second point.

Aspect 7: The method of any of Aspects 1 through 6, wherein the distance is a physical distance that is determined based on a first grid location of the first point and a second grid location of the second point.

Aspect 8: The method of any of Aspects 1 through 7, wherein the distance is a grid distance that is determined based on a quantity of cells along a line between a first cell that includes the first point and a second cell that includes the second point, and wherein the distance threshold comprises a quantity threshold that is based on a size of the cells of the grid.

Aspect 9: The method of any of Aspects 1 through 8, wherein the location information indicates an area of the physical environment that is occupied by one or more objects, wherein the area of the physical environment corresponds to an area of the grid that includes the subset of the cells.

Aspect 10: The method of any of Aspects 1 through 9, wherein the location information indicates a grid location associated with one or more of the subset of the cells.

Aspect 11: The method of any of Aspects 1 through 10, wherein performing the action comprises: indicating, via a user interface of the vehicle and based on the location information, a location of the occupied cluster relative to a location of the vehicle.

Aspect 12: The method of any of Aspects 1 through 11, wherein performing the action comprises: controlling the vehicle to avoid an area of the physical environment that is indicated in the location information.

Aspect 13: An apparatus for wireless communication at a device, comprising a processor; memory coupled with the processor; and instructions stored in the memory and executable by the processor to cause the apparatus to perform the method of one or more of Aspects 1 through 12.

Aspect 14: A device for wireless communication, comprising a memory and one or more processors coupled to the memory, the memory and the one or more processors configured to perform the method of one or more of Aspects 1 through 12.

Aspect 15: An apparatus for wireless communication, comprising at least one means for performing the method of one or more of Aspects 1 through 12.

Aspect 16: A non-transitory computer-readable medium storing code for wireless communication, the code comprising instructions executable by a processor to perform the method of one or more of Aspects 1 through 12.

Aspect 17: A non-transitory computer-readable medium storing a set of instructions for wireless communication, the set of instructions comprising one or more instructions that, when executed by one or more processors of a device, cause the device to perform the method of one or more of Aspects 1 through 12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:
1. A method comprising:
receiving, by a device and from a radar scanner or a LIDAR scanner of a vehicle, point data that identifies a first point and a second point;
generating, by the device, a first grid that is associated with mapping a physical environment of the vehicle, wherein the first grid includes:
a first set of cells having a first cell size,
a first grid location corresponding to the first point, and
a second grid location corresponding to the second point;
receiving, by the device, grid information that includes a second set of cells of a second grid that is associated with mapping the physical environment of the vehicle, wherein the grid information is received based at least in part on a change in the first cell size of the first set of cells in the first grid;
generating, by the device, the second grid that is associated with mapping the physical environment of the vehicle, wherein the second grid includes:
the second set of cells having a second cell size based at least in part on the change in the first cell size of the first set of cells in the first grid,
a third grid location corresponding to the first point, and
a fourth grid location corresponding to the second point;

designating, by the device and based on determining that a distance between the first point and the second point satisfies a distance threshold, a subset of cells in the second set of cells as an occupied cluster that is associated with the first point and the second point, wherein the distance threshold is a dynamic threshold that is configured based at least in part on at least one of:
   a speed of the vehicle,
   a density of points in the point data,
   a physical characteristic of the vehicle, or
   an operator characteristic of an operator of the vehicle; and
performing, by the device, an action associated with the vehicle based on location information associated with the occupied cluster.

2. The method of claim 1, wherein the grid information identifies at least one of:
   the second cell size of the second set of cells, or
   coordinates of the second set of cells in the second grid.

3. The method of claim 1, wherein the grid information is received further based at least in part on:
   a change in coordinates of the first set of cells in the first grid.

4. The method of claim 1, wherein the distance threshold is further configured based at least in part on preference information input by the operator of the vehicle.

5. The method of claim 1, wherein the subset of cells in the second set of cells are in line with the third grid location corresponding to the first point and the fourth grid location corresponding to the second point.

6. The method of claim 1, wherein the subset of cells in the second set of cells include at least one of:
   a first cell that includes the third grid location corresponding to the first point,
   a second cell that includes the fourth grid location corresponding to the second point, or
   a third cell that is located within the second grid between the first point and the second point.

7. The method of claim 1, wherein the distance is a physical distance that is determined based on the third grid location corresponding to the first point and the fourth grid location corresponding to the second point.

8. The method of claim 1, wherein the distance is a grid distance that is determined based on a quantity of cells along a line between a first cell that includes the first point and a second cell that includes the second point, and
   wherein the distance threshold comprises a quantity threshold that is based on the second cell size of the second set of cells of the second grid.

9. The method of claim 1, wherein the location information indicates an area of the physical environment that is occupied by one or more objects,
   wherein the area of the physical environment corresponds to an area of the second grid that includes the subset of cells in the second set of cells.

10. The method of claim 1, wherein the location information indicates a grid location associated with one or more of the subset of cells in the second set of cells.

11. The method of claim 1, wherein performing the action comprises:
   indicating, via a user interface of the vehicle and based on the location information, a location of the occupied cluster relative to a location of the vehicle.

12. The method of claim 1, wherein performing the action comprises:
   controlling the vehicle to avoid an area of the physical environment that is indicated in the location information.

13. A device, comprising:
one or more memories; and
one or more processors, coupled to the one or more memories, configured to:
   receive, from a radar scanner or a LIDAR scanner of a vehicle, point data that identifies a first point and a second point;
   generate a first grid that is associated with mapping a physical environment of the vehicle, wherein the first grid includes:
      a first set of cells having a first cell size,
      a first grid location corresponding to the first point, and
      a second grid location corresponding to the second point;
   receive grid information that includes a second set of cells of a second grid that is associated with mapping the physical environment of the vehicle, wherein the grid information is received based at least in part on a change in the first cell size of the first set of cells in the first grid;
   generate the second grid that is associated with mapping the physical environment of the vehicle, wherein the second grid includes:
      the second set of cells having a second cell size based at least in part on the change in the first cell size of the first set of cells in the first grid,
      a third grid location corresponding to the first point, and
      a fourth grid location corresponding to the second point;
   designate, based on determining that a distance between the first point and the second point satisfies a distance threshold, a subset of cells in the second set of cells as an occupied cluster that is associated with the first point and the second point, wherein the distance threshold is a dynamic threshold that is configured based at least in part on at least one of:
      a speed of the vehicle,
      a density of points in the point data,
      a physical characteristic of the vehicle, or
      an operator characteristic of an operator of the vehicle; and
   perform an action associated with the vehicle based on location information associated with the occupied cluster.

14. The device of claim 13, wherein the grid information identifies at least one of:
   the second cell size of the second set of cells, or
   coordinates of the second set of cells in the second grid.

15. The device of claim 13, wherein the distance threshold is further configured based at least in part on preference information input by the operator of the vehicle.

16. The device of claim 13, wherein the subset of cells in the second set of cells are in line with the third grid location corresponding to the first point and the fourth grid location corresponding to the second point.

17. The device of claim 13, wherein the distance is a physical distance that is determined based on the third grid location corresponding to the first point and the fourth grid location corresponding to the second point.

18. The device of claim 13, wherein the one or more processors, to perform the action, are configured to at least one of:

indicate, via a user interface of the vehicle and based on the location information, a location of the occupied cluster relative to a location of the vehicle, or control the vehicle to avoid an area of the physical environment that is indicated in the location information.

19. A non-transitory computer-readable medium storing a set of instructions, the set of instructions comprising:

one or more instructions that, when executed by one or more processors of a device, cause the device to:

receive, from a radar scanner or a LIDAR scanner of a vehicle, point data that identifies a first point and a second point;

generate a first grid that is associated with mapping a physical environment of the vehicle, wherein the first grid includes:

a first set of cells having a first cell size, a first grid location corresponding to the first point, and a second grid location corresponding to the second point;

receive grid information that includes a second set of cells of a second grid that is associated with mapping the physical environment of the vehicle, wherein the grid information is received based at least in part on a change in the first cell size of the first set of cells in the first grid;

generate the second grid that is associated with mapping the physical environment of the vehicle, wherein the second grid includes:

the second set of cells having a second cell size based at least in part on the change in the first cell size of the first set of cells in the first grid, a third grid location corresponding to the first point, and a fourth grid location corresponding to the second point;

designate, based on determining that a distance between the first point and the second point satisfies a distance threshold, a subset of cells in the second set of cells as an occupied cluster that is associated with the first point and the second point, wherein the distance threshold is a dynamic threshold that is configured based at least in part on at least one of:

a speed of the vehicle, a density of points in the point data, a physical characteristic of the vehicle, or an operator characteristic of an operator of the vehicle; and perform an action associated with the vehicle based on location information associated with the occupied cluster.

20. The non-transitory computer-readable medium of claim 19, wherein the grid information identifies at least one of:

the second cell size of the second set of cells, or coordinates of the second set of cells in the second grid.

21. The non-transitory computer-readable medium of claim 19, wherein the distance threshold is further configured based at least in part on preference information input by the operator of the vehicle.

22. The non-transitory computer-readable medium of claim 19, wherein the subset of cells in the second set of cells are in line with the third grid location corresponding to the first point and the fourth grid location corresponding to the second point.

23. The non-transitory computer-readable medium of claim 19, wherein the distance is a physical distance that is determined based on the third grid location corresponding to the first point and the fourth grid location corresponding to the second point.

24. The non-transitory computer-readable medium of claim 19, wherein the one or more instructions, that cause the device to perform the action, cause the device to:

indicate, via a user interface of the vehicle and based on the location information, a location of the occupied cluster relative to a location of the vehicle, or control the vehicle to avoid an area of the physical environment that is indicated in the location information.

25. An apparatus, comprising:

means for receiving, from a radar scanner or a LIDAR scanner of a vehicle, point data that identifies a first point and a second point;

means for generating a first grid that is associated with mapping a physical environment of the vehicle, wherein the first grid includes:

a first set of cells having a first cell size, a first grid location corresponding to the first point, and a second grid location corresponding to the second point;

means for receiving grid information that includes a second set of cells of a second grid that is associated with mapping the physical environment of the vehicle, wherein the grid information is received based at least in part on a change in the first cell size of the first set of cells in the first grid;

means for generating the second grid that is associated with mapping the physical environment of the vehicle, wherein the second grid includes:

the second set of cells having a second cell size based at least in part on the change in the first cell size of the first set of cells in the first grid, a third grid location corresponding to the first point, and a fourth grid location corresponding to the second point;

means for designating, based on determining that a distance between the first point and the second point satisfies a distance threshold, a subset of cells in the second set of cells as an occupied cluster that is associated with the first point and the second point, wherein the distance threshold is a dynamic threshold that is configured based at least in part on at least one of:

a speed of the vehicle, a density of points in the point data, a physical characteristic of the vehicle, or an operator characteristic of an operator of the vehicle; and means for performing an action associated with the vehicle based on location information associated with the occupied cluster.

26. The apparatus of claim 25, wherein the grid information identifies at least one of:

the second cell size of the second set of cells, or coordinates of the second set of cells in the second grid.

27. The apparatus of claim 25, wherein the distance threshold is further configured based at least in part on preference information input by the operator of the vehicle.

28. The apparatus of claim 25, wherein the subset of cells in the second set of cells are in line with the third grid location corresponding to the first point and the fourth grid location corresponding to the second point.

29. The apparatus of claim 25, wherein the distance is a physical distance that is determined based on the third grid location corresponding to the first point and the fourth grid location corresponding to the second point.

30. The apparatus of claim 25, wherein the means for performing the action comprises:
   means for indicating, via a user interface of the vehicle and based on the location information, a location of the occupied cluster relative to a location of the vehicle, or
   means for controlling the vehicle to avoid an area of the physical environment that is indicated in the location information.

\* \* \* \* \*